United States Patent [19]

Estrada et al.

[11] Patent Number: 4,865,410
[45] Date of Patent: Sep. 12, 1989

[54] DECOUPLED FIBER OPTIC FEEDTHROUGH ASSEMBLY

[75] Inventors: Calixto Estrada, Wilmington, Del.; James D. Hamerslag, West Chester, Pa.; Robert W. Hooley, Wilmington, Del.; John W. Hunt, Wilmington, Del.; Melvin H. Johnson, Chadds Ford, Pa.; Duncan D. McCabe, Wilmington, Del.; Joseph A. Perrotto, Landenberg, Pa.

[73] Assignee: E. I. Du Pont de Nemours and Company, Wilmington, Del.

[21] Appl. No.: 147,830

[22] Filed: Jan. 25, 1988

[51] Int. Cl.$^4$ .............................................. G12B 6/42
[52] U.S. Cl. ................................................. 350/96.20
[58] Field of Search .............. 350/96.20, 96.21, 96.22, 350/96.15; 250/227; 357/74

[56] References Cited

U.S. PATENT DOCUMENTS

| | | | |
|---|---|---|---|
| 4,119,363 | 10/1978 | Camlibel et al. | 350/96.20 |
| 4,186,994 | 2/1980 | Denkin et al. | 350/96.17 |
| 4,192,574 | 3/1980 | Henry et al. | 350/96.17 |
| 4,296,998 | 10/1981 | Dufft | 350/96.20 |
| 4,355,323 | 10/1982 | Kock | 357/74 |
| 4,357,072 | 11/1982 | Goodfellow et al. | 350/96.20 |
| 4,479,698 | 10/1984 | Landis et al. | 350/96.20 |
| 4,591,711 | 5/1986 | Taumberger | 250/227 |
| 4,623,220 | 11/1986 | Grabbe et al. | 350/96.20 |
| 4,627,687 | 12/1986 | Dorn et al. | 350/96.20 |
| 4,687,290 | 8/1987 | Paussas | 350/96.20 |
| 4,699,456 | 10/1987 | Mackenzie | 350/96.20 |
| 4,707,066 | 11/1987 | Falkenstein et al. | 350/96.20 |
| 4,733,932 | 3/1988 | Frenkel et al. | 350/96.20 |
| 4,752,109 | 6/1988 | Gordon et al. | 350/96.20 |

FOREIGN PATENT DOCUMENTS

| | | | |
|---|---|---|---|
| 148012 | 7/1985 | European Pat. Off. | 350/96.20 |
| 3211792 | 11/1983 | Fed. Rep. of Germany . | |
| 2504693 | 10/1982 | France | 350/96.20 |
| 2584827 | 1/1987 | France | 350/96.15 |

OTHER PUBLICATIONS

Kuwahara et al., "Efficient Coupling from Semiconductor Lasers. . . ", Applied Optics, vol. 19, No. 15, Aug. 1980.

Primary Examiner—Frank Gonzalez

[57] ABSTRACT

A fiber optic device is provided with a feedthrough assembly adapted to decouple deflections imposed on the feedthrough from lensed end of a fiber disposed within the feedthrough assembly.

9 Claims, 12 Drawing Sheets

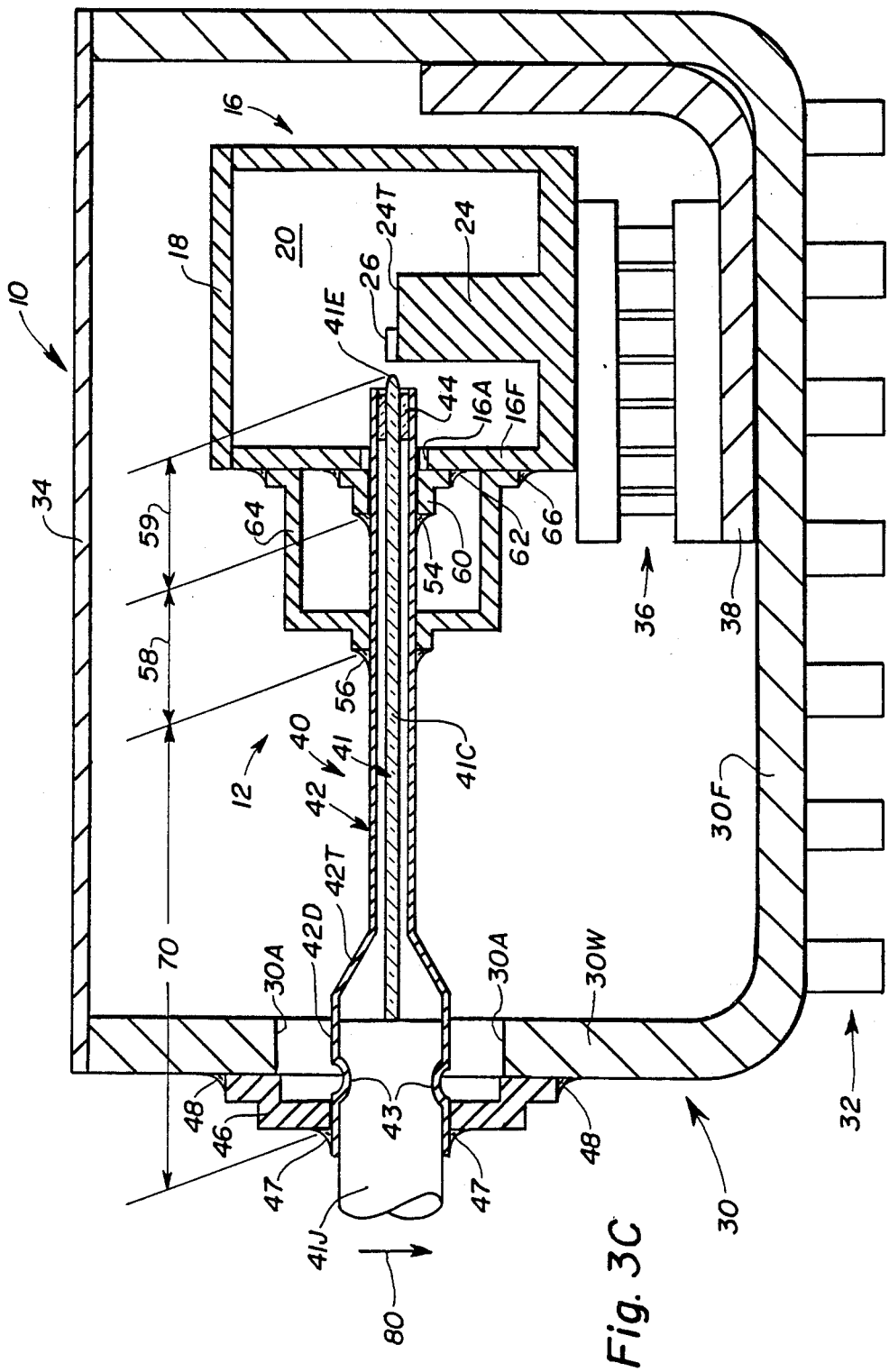

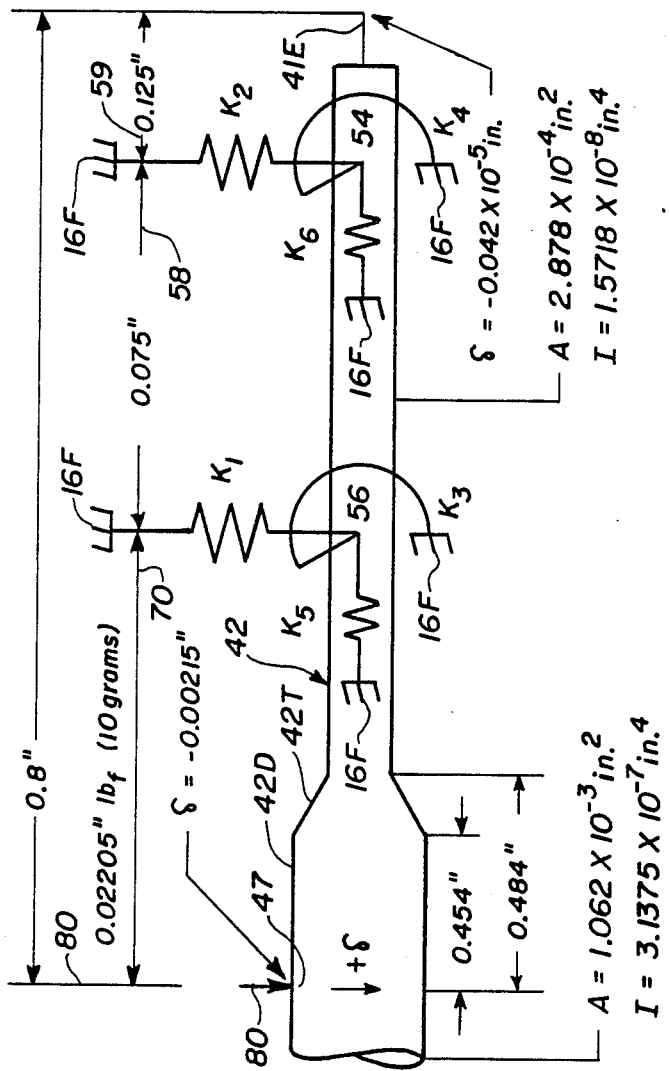
Fig. 8 BEAM AND SPRING SIMPLIFIED MODEL SHOWING NEAR OPTIMUM GEOMETRY AND PARAMETER VALUES

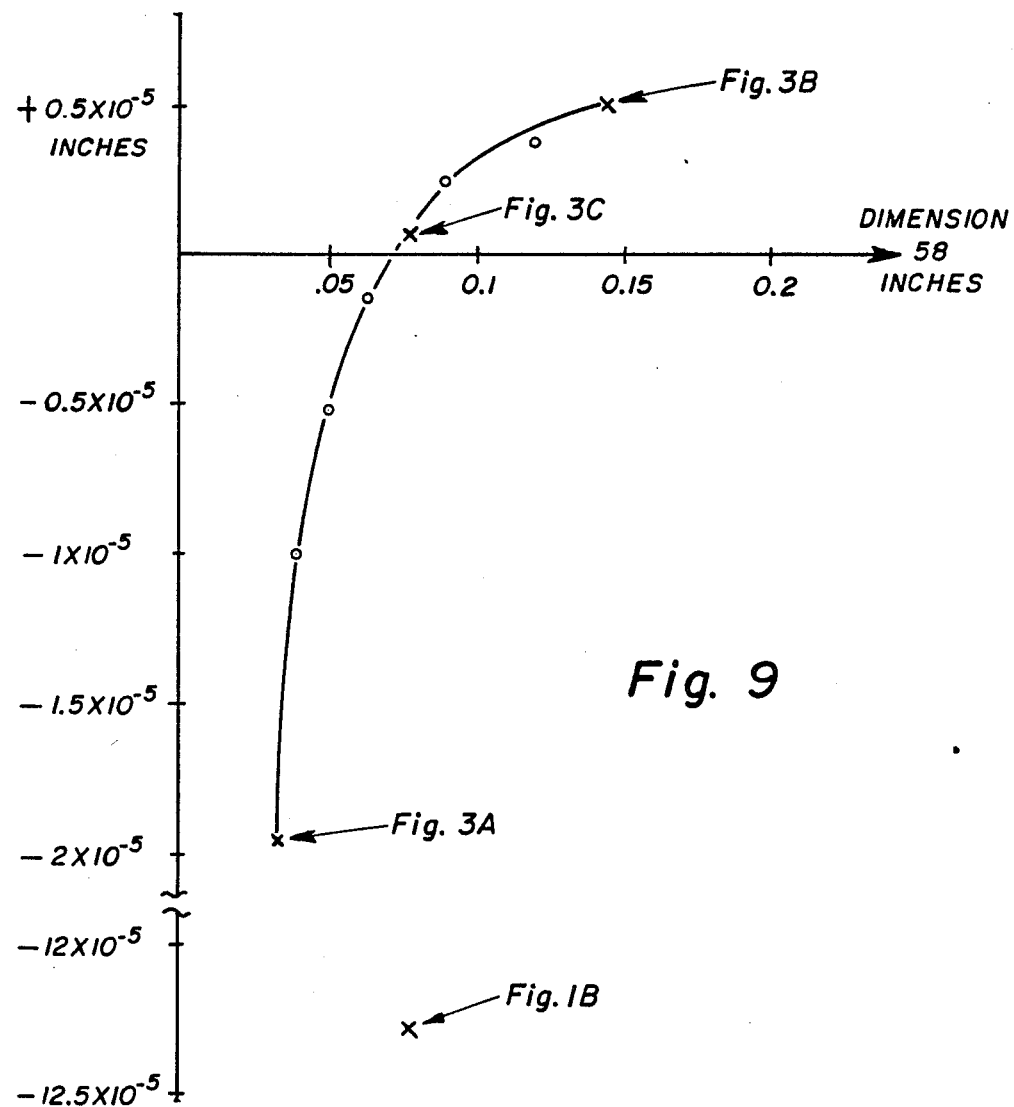

DECOUPLED FIBER OPTIC FEEDTHROUGH ASSEMBLY

This invention relates to a fiber optic communication component and, in particular, to an arrangement for the mounting of the component within a package.

Description of the Prior Art

Opto-electronic components for use in telecommunications systems contain active elements for either transmitting, detecting, or switching light with respect to an optical fiber link. Such components are normally "pigtailed" assemblies that include two primary subassemblies: (1) a housing containing the active element for the component, e.g., a semiconductor laser diode in the case of a transmitter or a PIN photodetector in the case of a receiver; and (2) a fiber feedthrough subassembly comprising a length of fiber optic cable (generally one to two meters in length) having a lensed end thereon attached to and sealed within a supporting member, such as an elongated sleeve.

The housing containing the component may be disposed within a package that includes other electronic circuitry.

The feedthrough subassembly can exhibit a first configuration, as may be seen in FIG. 1A, in which the lensed end of the fiber is rigidly attached to the sleeve proximal to the end thereof, as by a washer-like member. In this instance one manufacturing step is required to align the lensed end of the fiber to the active element and simultaneously attach the sleeve to the housing at a first attachment point proximal thereto. As an example of this configuration reference is invited to U.S. Pat. Nos. 4,119,363 (Camlibel); 4,687,290 (Prussas); 4,357,072 (Goodfellow).

A modification to this first configuration is shown in FIG. 1B. This modification is disclosed in U.K. Application 8708034, filed Apr. 3, 1987. In this instance the sleeve is also supported at a second attachment point distal from the housing using a bushing.

The feedthrough subassembly can also exhibit a second configuration, as shown in FIG. 2, in which the lensed end of the fiber loosely overhangs some predetermined distance past the end of the sleeve. In this second configuration, two separate manufacturing steps are required: alignment and fixing of the lensed end of the fiber with respect to the active element followed by attachment of the supporting sleeve to the housing. This configuration is exemplified by U.S. Pat. Nos. 4,296,998 (Dufft); 4,591,711 (Taumberger); 4,627,687 (Dorn); 4,186,994 (Denkin); 4,479,698 (Landis) and 4,623,220 (Grabbe).

In either configuration alignment between the lensed end of the fiber and the active element is normally done in an empirical fashion. For example, in the case of a transmitter the semiconductor laser is energized and micromanipulators grasp the sleeve or the lensed end of the fiber, as appropriate, and iteratively displace it with respect to the laser until the location is found whereat the maximum amount of light is detected at the free end of the fiber. Once this maximum coupling is achieved the position of the lensed end of the fiber with respect to the active element is fixed.

In the second configuration (FIG. 2) the lensed end of the fiber is secured to a pedestal immediately adjacent to the active element. The support sleeve is subsequently attached to the housing to complete the assembly. In the first configuration (FIG. 1A) the fixing is accomplished by welding, soldering or otherwise fastening the sleeve at least the first point proximal to the housing. In cases where the additional second attachment point distal from the first is used (FIG. 1B), the proximal attachment achieves coarse alignment. The sleeve is then manipulated about the first attachment point to achieve fine adjustment and to correct any misalignments resulting from the first attachment. The sleeve is then fastened at the distal point.

It is important in all of the discussed configuratons that once achieved the alignment not be altered more than some predetermined in a plane perpendicular to the axis of the fiber. Typically, in the case of a transmitter, this amount is on the order of 0.5 micrometer, or may even be as low as 0.1 micrometer, depending upon the spacing between the end of the fiber and the active element (i.e., semiconductor laser in the case of a transmitter).

However, during subsequent manufacture, packaging, storage or use of the component the probability exits that external deflection could be imposed on the sleeve. These external forces could manifest themselves during subsequent repackaging of the component to meet an ultimate end user's application. In the second configuration (FIG. 2) deflection of the sleeve does not adversely impact optical coupling because the lensed end of the fiber is fixed to the pedestal and is not influenced motion of the sleeve. However, with the first configuration (FIGS. 1A, 1B), external deflection of the sleeve does influence the alignment between the lensed end of the fiber and the active element. This is true even in the instance of the modified structure (FIG. 1B, having two attachment points) because the sleeve has to be of sufficient stiffness to accomplish the fine adjustment.

Accordingly, in view of the foregoing it is believed advantageous to provide a structure for a feedthrough subassembly for a component of the first configuration so that when the component is mounted within a package the lensed end of the fiber is isolated from the effects of a deflection imposed on the sleeve.

SUMMARY OF THE INVENTION

A fiber optic device in accordance with the present invention includes a housing with an apertured front wall within which an active element is disposed. An optical fiber feedthrough assembly, including a sleeve surrounding an optical fiber, extends through the aperture to dispose a first, lensed, end of the fiber into a predetermined aligned relationship with the active element. A bushing and a washer are provided for attaching the feedthrough assembly to the front wall at respective first, proximal, and second, distal, attachment locations that are offset from each other by a predetermined offset distance. The front wall of the housing, the bushing, the washer and the attachments therebetween cooperate to define a joint assembly that has a predetermined flexibility associated therewith. A support abutment is provided for supporting the feedthrough assembly at a predetermined point of support, the point of support being placed a predetermined span distance from the distal attachment location. Means is disposed on the feedthrough assembly intermediate the first end of the fiber and the point of support of the feedthrough assembly for isolating the first end of the fiber from the effects of a deflection imposed on the feedthrough assembly.

In one embodiment of the invention the means comprises providing that portion of the feedthrough assembly intermediate the distal attachment location and the point of support with a flexibility that is greater than the flexibility of the joint assembly whereby the first end of the fiber is isolated from the effects of a deflection imposed on the sleeve.

In a more detailed embodiment the flexibility of the feedthrough assembly, the bushing, the washer, the front wall, and the attachments therebetween as well as the offset distance are matched such that the first end of the fiber is substantially totally isolated from the effects of a deflection imposed on the sleeve. Other embodiments of the isolating means include a circumferential slot, a flexible member in the form of a bellows, an elasotmeric body or a mass of silicone or injection molded plastic is disposed at a point along the span intermediate the distal attachment location and the point of support.

BRIEF DESCRIPTION OF THE DRAWINGS

The invention will be more fully understood from the following detailed description thereof, taken in connection with the accompanying drawings, which form a part of this application and in which:

FIGS. 3A, 3B and 3C are side elevational views in section illustrating a fiber optic device in accordance with the present invention;

FIG. 8 is a simplified beam and spring model of the preferred embodiment of the invention with parameter values used in a stress and deflection analysis indicated thereon; and FIG. 9 is a graphical depiction of the results of the analysis using the model of FIG. 8.

DETAILED DESCRIPTION OF THE INVENTION

Figure 1A:
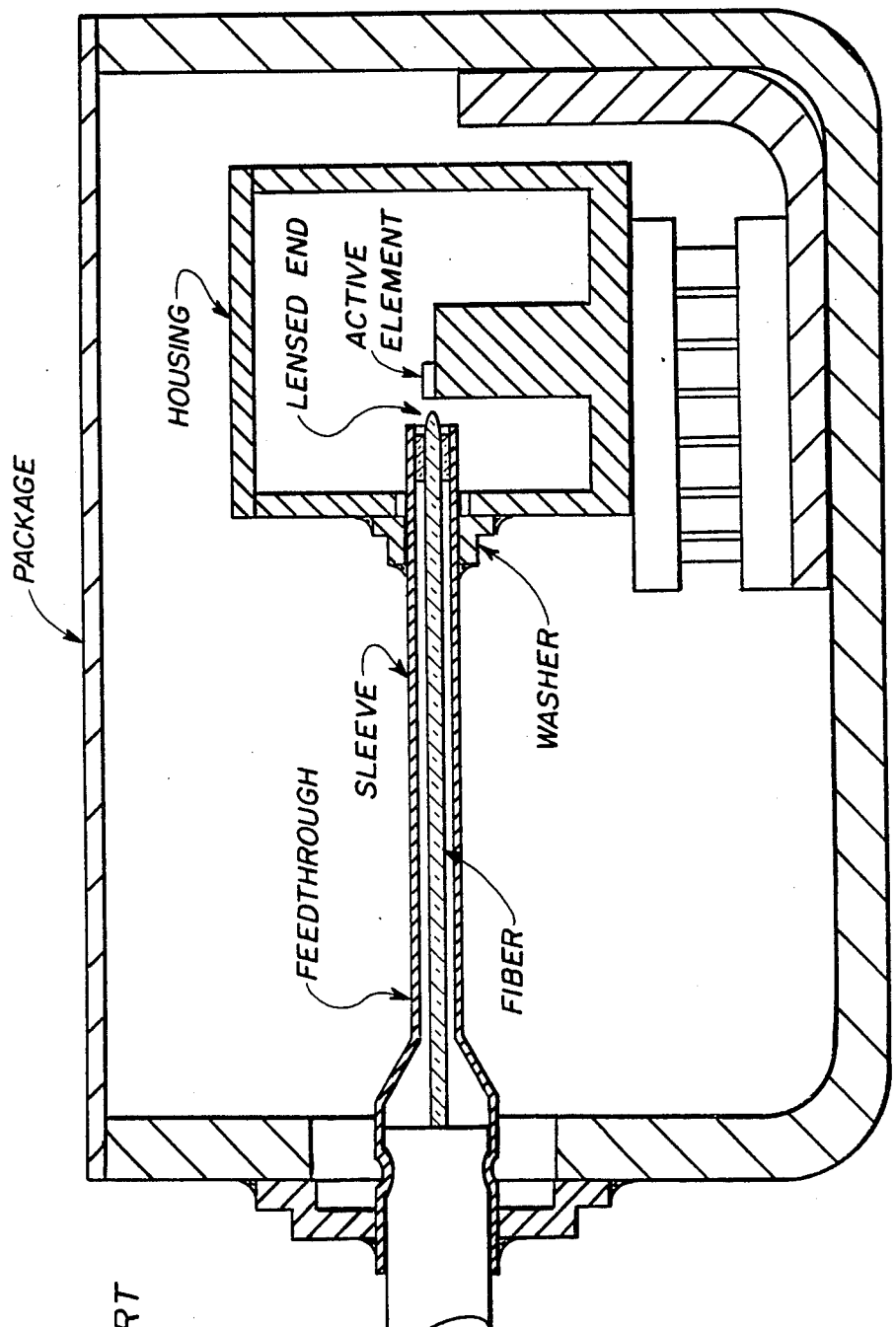
FIGS. 1A, 1B and 2 are side elevational views in sections illustrating configurations of pigtailed components in accordance with the prior art.

Throughout the following detailed description similar reference numerals refer to similar elements in all Figures of the drawings.

Figure 3A:
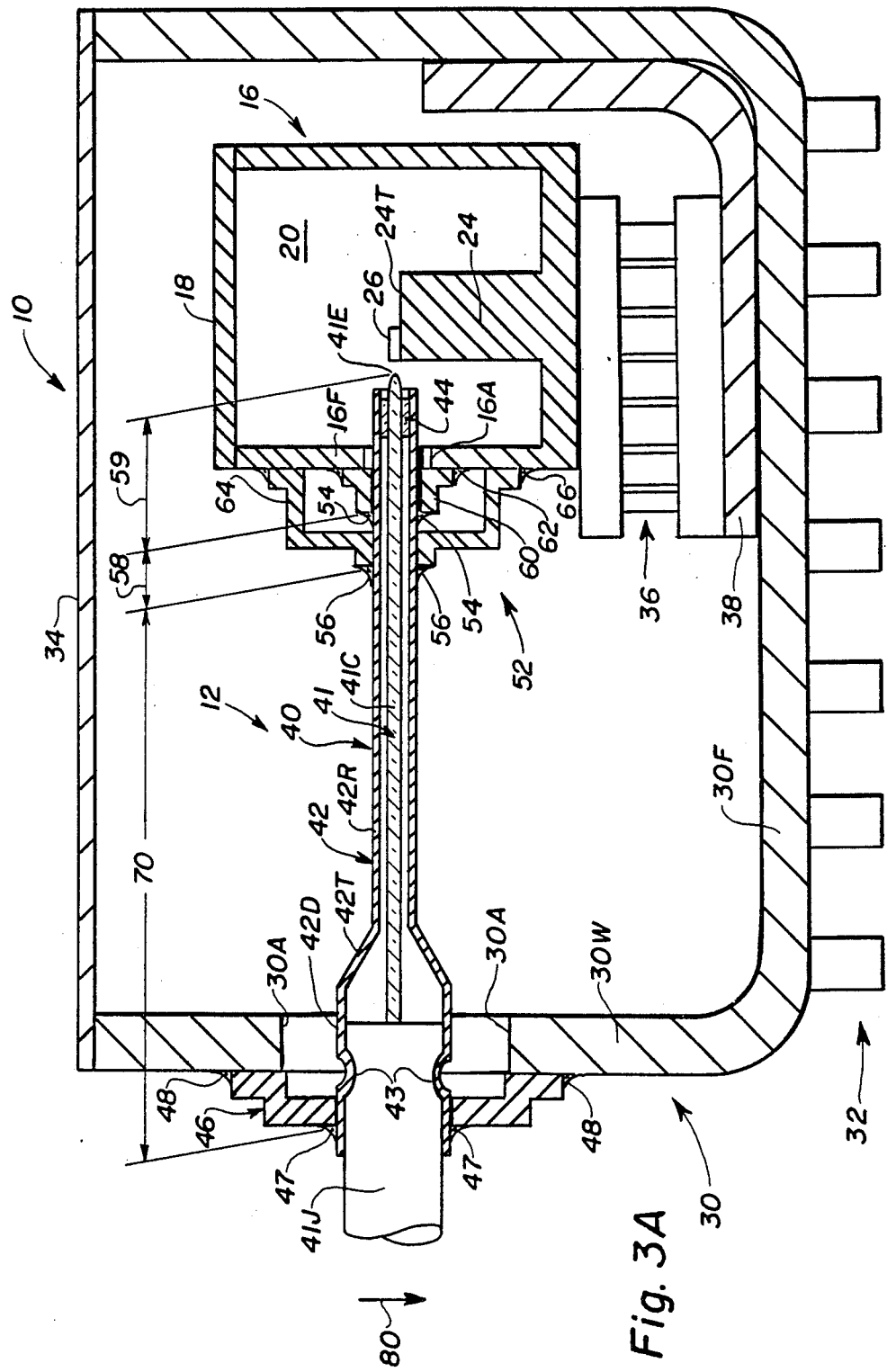

With respect to FIG. 3A shown is a fiber optic device generally indicated by reference character 10 having a deflection isolating decoupling arrangement generally indicated by reference character 12 disposed in accordance with the present invention. The device 10 includes a housing 16 having a cover 18 which defines an enclosed, hermetically sealed chamber 20 on the interior thereof. The housing 16 has wall 16F that is provided with an aperture 16A extending therethrough. A mounting pedestal 24 is disposed within the chamber 20 and supported from the floor of the housing 16. The housing 16 is preferably formed of metal, such as copper or copper/tungsten or Kovar alloy, for heat dissipation purposes, although it should be understood that alternate materials, such as ceramics, may be used. It should be understood that pedestal 24 may taken the form of a heat spreader, such as a diamond, aluminum nitride, silicon or ceramic member.

An active element 26 is suitably attached, as by soldering or thermal compression bonding or the like, to the upper surface 24T of the pedestal 24. The active element may be any suitable electro-optic element such as, in the case of a transmitter a semiconductor laser diode or, in the case of a receiver, a PIN photodiode. As will be appreciated by those skilled in the art suitable means for passing electrical signals into and out of the housing 16 is provided, such as glass sealed wire terminals, although such means are not illustrated in the Figures for clarity of illustration.

The housing, in the preferred instance, is itself mounted within a package 30. The package 30 is a standard, multi-lead (fourteen pin) package. The leads 32 from the package 30 are arranged in a dual-in line or butterfly configuration. Other packages and lead configurations may, of course, be used. The package 30 has an opening 30A provided in one sidewall 30W thereof. The opening 30A in the package 30 is in generally axial alignment with the aperture 16A of the housing 16. The package is covered by a lid 34. The package 30 need not be hermetically sealed although it may be so arranged if desired.

The housing 16 is mounted on the floor 30F of the package 30 on a thermoelectric cooler 36 and a heat conducting support bracket 38. The bracket 38 is secured to the package 30. The remaining space on the interior of the package 30 may be occupied by electronic circitry associated with the active element 16.

An optical fiber feedthrough assembly 40 of the type having a fiber optic cable 41 attached within a metallic sleeve 42 combines with the housing 16 and the contents thereof to define a fiber optic component. The cable 41 includes a cladded glass core 41C the first end 41E of which is provided with a tapered lens. The sleeve 42 has a reduced diameter portion 42R which surround the cladded core portion 41C of the cable 41. A tapered transition region 42T is defined between the reduced diameter portion 42R and a distended portion 42D of the sleeve 42. The jacket 41J of the cable 41 is secured, as at 43, by crimping or cementing, to a distended portion 42D of the sleeve 42. A portion of the sleeve 42 extends through the aperture 16A in the wall 16F housing 16 to dispose the first, or lensed, end 41E of the fiber 41 within the chamber 20 of the housing 16. A glass seal 44 is provided to rigidly attach and to hermetically seal the cladded core portion 41C of the cable adjacent the first end 41E thereof with respect to the reduced diameter portion 42R of the sleeve 42.

The sleeve 40 extends through the opening 30A of the package 30 and is welded or soldered to an annular metal washer 46. This attachment is indicated by the reference character 47. The washer 46 is itself attached to the wall 30W of the package 30, as indicated at 48. The attachment 48 may be effected by welding or soldering. The washer 66 may thus be viewed as an extension of the package which generally acts like a pin with a torsional spring constant. The feedthrough assembly 40 is thus supported with respect to the floor 30F of the package 30 at the point of support 47 defined by the welded or soldered attachment of the washer 46 to the distended portion 42D of the sleeve 42.

In the illustrated embodiment the package 30 supports both the housing 16 and the feedthrough assembly 40 with respect to the floor 30F. It should be appreciated that this support function may be equally achieved using a suitable support member (corresponding in function to the floor 30F) on which the housing 16 is received and a support abutment (corresponding in function to the wall 30W) connected to the support member on which the feedthrough 40 is mounted whereby both the housing 16 and the feedthrough assembly 40 are supported with respect to the support member. In this instance the washer 46 may be omitted, if desired. Of course, a package may then be disposed about this collection of elements, if desired.

A mounting joint assembly generally indicated by reference character 52 is provided for attaching the sleeve 42 of the feedthrough assembly 40 to the housing 16 at a first, proximal, attachment location 54 and a second, distal, attachment location 56. The locations 54 and 56 on the sleeve 42 are offset from each other by a predetermined offset distance 58. The lensed end of the fiber 41 is spaced a distance 59 from the proximal attachment location 54. Preferably both of the attachment locations 54, 56 lie externally to the chamber 20 and the offset distance 58 is measured with respect to the axis of the sleeve 42. However, it should be understood that for the purposes of the present invention the first attachment location 54 may be disposed on the interior of the wall of the front wall 16F of the housing 16 or may be disposed on a separate attachment abutment lying within the chamber 20.

Alignment and fixing of the optical fiber feedthrough assembly 40 to the housing 16 is normally done in an empirical fashion. For example, with a portion of the sleeve 42 extending through the aperture 16A of the housing 16 the active element 26, in the case of a transmitter a semiconductor laser, is energized. Micromanipulators grasp the sleeve 42 and iteratively displace it with respect to the active element 26 until the orientation therebetween is found whereat the maximum amount of light is detected at opposite or free end (not shown) of the fiber 41. Once this maximum coupling is achieved the position of the lensed end 41E of the fiber 41 is fixed with respect to the active element 26. The fixing is accomplished by welding or soldering an annular metallic washer 60 to both the metallic sleeve 42 (as indicated at the reference character 54) and the exterior of the wall of the housing 16 adjacent the aperture 16A therein (as indicated by the reference character 62). The first, proximal, attachment location 54 is in the location at which the annular washer 60 is secured to the sleeve 42. A metallic support bushing 64 is welded or soldered to the sleeve 42 (as indicated at the reference character 56) and to the housing 16 (as indicated by the reference character 66) to further fix the alignment and to reinforce the attachment of the sleeve 42. The second, distal, attachment location 56 is the location at which the support bushing 64 and the metallic sleeve 42 are joined. When attached in the manner described the first end 41E of the fiber 41 lies in a predetermined operative relationship with respect to the active element 26. The sleeve 42 is hermetically sealed to the housing 16 in a redundant fashion by the attachments 56, 66 and 54, 62.

The distance between the point of attachment of the feedthrough 40 and the package (as shown by the attachment 48 of the washer 46 to the sleeve 42) and the second, distal, attachment location 56 on the sleeve 42 defines a predetermined span 70 measured with respect to the axis of the sleeve 42. The paired attachments indicated in the Figures at reference characters 54 and 62, 56 and 66, and 47 and 48 in practice permit some rotation of the sleeve 42 about an axis perpendicular to the sleeve with respect to the washer 60, the bushing 64 and the collar 46, respectively. These attachments may be considered to act like a pin with a torsional spring constant.

The joint assembly 52 may be seen to include the washer 60; the bushing 64; their respective attachments 54, 62, and 56, 66; and the front wall 16F of the housing 16. The joint assembly 52 has a predetermined flexibility associated therewith. From the foregoing it may be understood that both the housing 16 and the feedthrough assembly 40 are mounted to the support member (in the form of the floor 30F and the wall 30W, respectively) and that the feedthrough is also connected to the housing 16 via the joint assembly 52.

It is important that once achieved the alignment between the lensed end 41E and the active element 26 not be altered more than some predetermined maximum distance in a plane perpendicular to the axis of the fiber. In the case of a transmitter the distance typically lies on the order of 0.5 micrometer, or may be as low as 0.1 micrometer, depending upon the spacing of the end 41E from the active element 26. The distance is usually defined in terms of the distance in which a predetermined loss of coupling efficiency (e.g., ten percent) between the fiber and active element occurs.

However, in practice it has been found that during subsequent manufacture, packaging, storage or use the potential exists that deflections could be imposed on the sleeve that adversely disturb the alignment between the end of the fiber and the active element. For example, during operation of the device 10 thermal expansion of the housing 16 may not match the thermal expansion of the package 30 resulting in forces which can cause deflection of the feedthrough assembly 40 at the point of support 46 and deflection of the lensed end 41E of the fiber 41. This could result in the altering the alignment between the fiber 41E and the active element 26. The direction of the deflection may be indicated by the reference arrow 80.

Figure 1B:
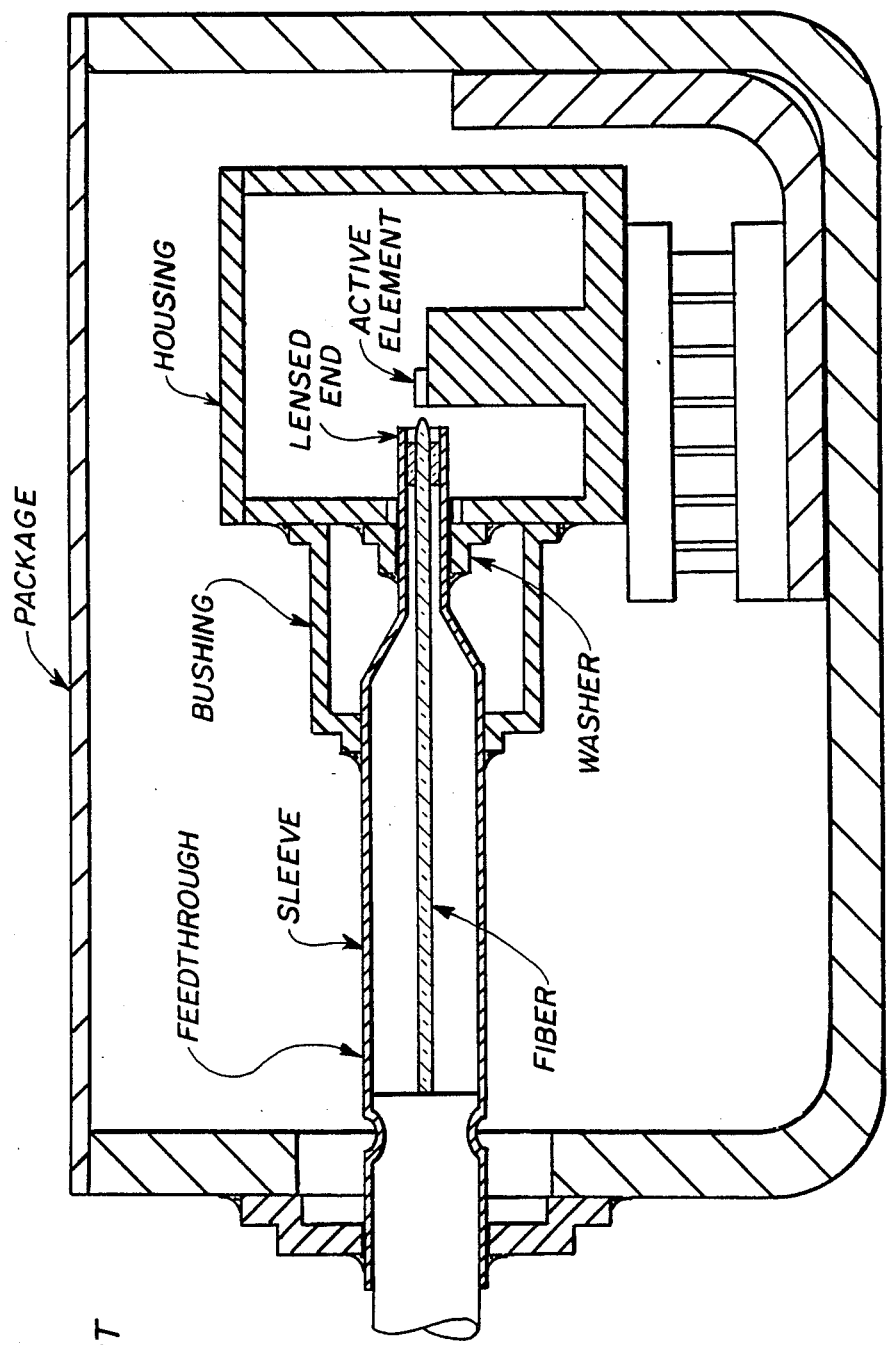
Figure 2:
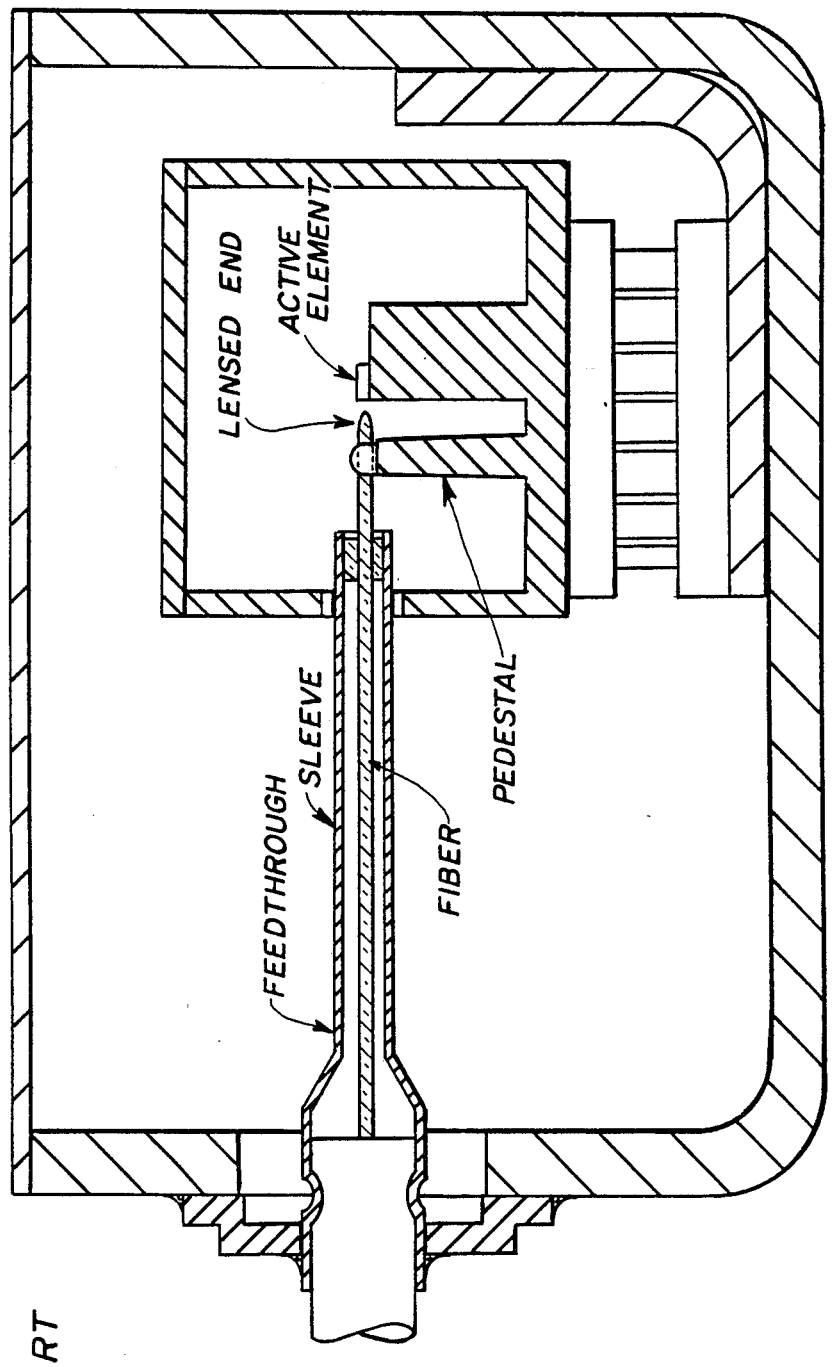

In the Prior Art, as exemplified by the arrangement shown in FIG. 1B, the feedthrough assembly 40 is relatively stiff, since the relatively larger diameter distended portion of the sleeve is disposed between the bushing and the point of support 47 of the sleeve 42 to the package 30. Accordingly the deflection imposed on the feedthrough 40 is transmitted in such a way that the alignment of the lensed end 41E of the fiber is altered.

In accordance with the present invention the isolating means 12 is provided to decouple the first, lensed, end 41E of the fiber 41 from the effects of a deflection imposed on the feedthrough assembly 40. In general the isolating means 12 is disposed intermediate the first end 41E of the fiber 41 and the point of support 47.

In accordance with the embodiment of the invention shown in FIG. 3A the isolating means is implemented by increasing the flexibility of the feedthrough 40 intermediate the end 41E of the fiber 41 and the point of support 47 with respect to the flexibility of the joint assembly 52. Specifically the increase in flexibility is provided in the span 70 defined between the distal attachment location 56 and the point of support 47. The increase in flexibility may be accomplished, for example, by reducing the diameter of the sleeve 42 in the portion 42R thereof.

As may be seen in FIG. 9, increasing the flexibility of the reduced diameter portion 42R of the sleeve 40 with respect to the joint assembly 52 results in a substantial reduction in the magnitude of the deflection of the lensed end 41E of the fiber 41 over the Prior Art arrangement shown in FIG. 1B, for a given deflection.

For purposes of the embodiment of the invention shown in FIG. 3A the rigidity of the washer 60 and the bushing 64 are not taken into account and may, in fact, be considered as rigid members. However, the washer 60 and the bushing 64, and the lines of attachment 54, 56, 62, 66 are not rigid. Accordingly, in a more detailed embodiment of the present invention the flexibility of the washer 60, the bushing 64, and the attachments between them and the housing 16 are considered. Such an arrangement as that shown in FIG. 3A may be physically modeled as shown in FIG. 8.

Using the model shown in FIG. 8, with two points of attachment 54 and 56, a compliance constant $K_1$ for the flexibility of the bushing 64, a compliance constant $K_2$ for the flexibility of the washer 60, a compliance constant $K_5$ for the flexibility of the reduced diameter portion 42D in the span 70, a compliance constant $K_6$ for the reduced diameter portion 42D lying in the offset distance 58, a rotational compliance constant $K_3$ for the attachment rotation flexibility of the bushing 64 through the attachment point 56, and a rotational compliance constant $K_4$ for the rotational flexibility of the washer 60 through the attachment point 54, may all be defined. Once so defined, stress and deflection analysis can be performed. The analysis may be made as a finite element analysis using a modeling system with a PATRAN preprocessor, a NASTRAN finite element program, with the result displayed via a PATRAN postprocessor. The values of the parameters used in an example of the analysis are set forth on Figure 8. The results of such an analysis are set forth in FIG. 9.

Figure 3B:
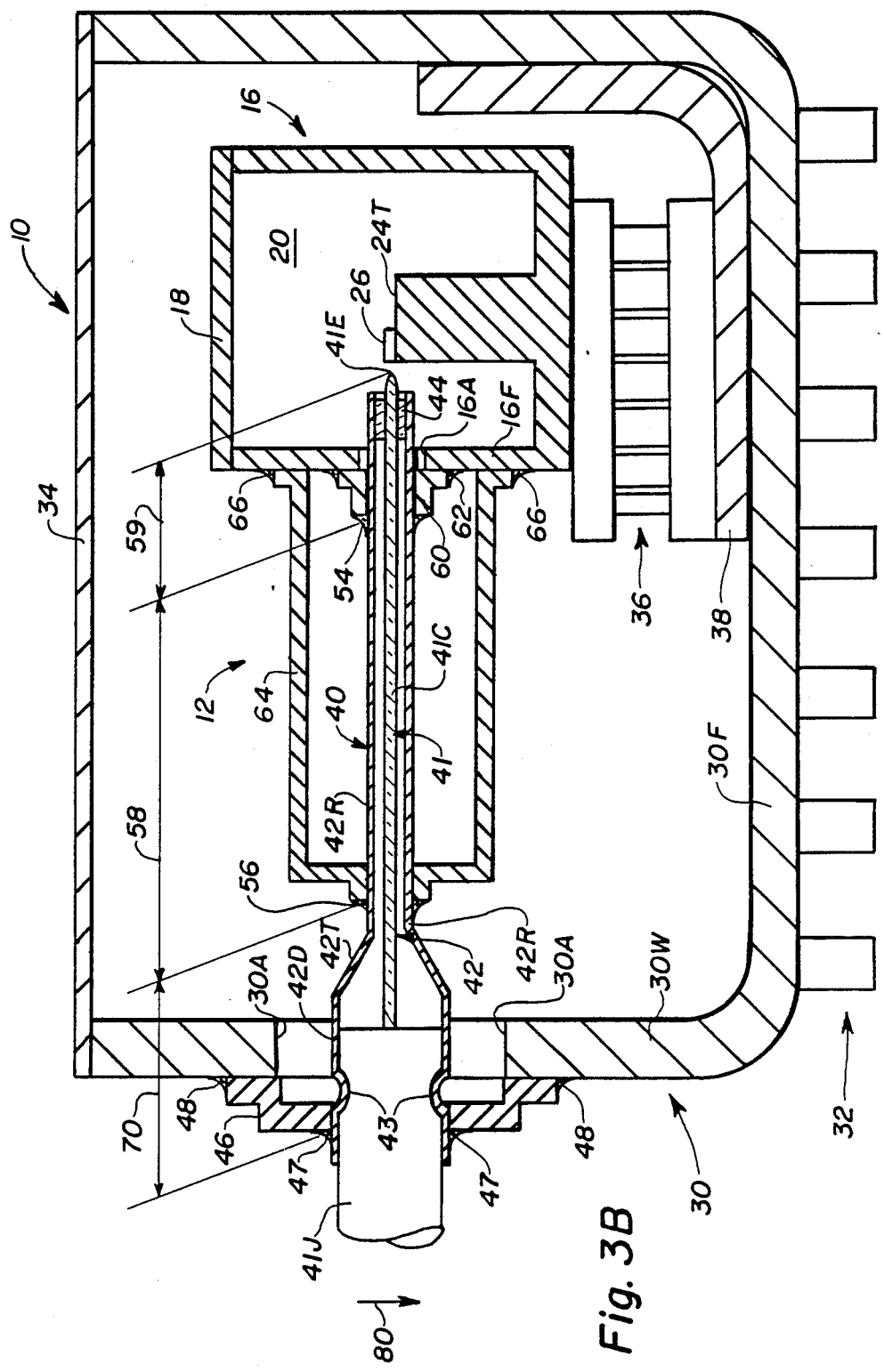

As an example, comparing the Prior Art arrangement of FIG. 1B (in which the distended portion 42D of the sleeve 42 is attached to the bushing 64) with the embodiment of the invention shown in FIG. 3A (in which the offset distance 58 is minimized) the deflection of the tip 41E of the fiber 41 is significantly reduced. It is noted that the tip 41E moves in a direction opposite the direction of the applied deflection 80. When the embodiment of the invention shown in FIG. 3B is used (in which the offset distance 58 is extended increased over that shown in FIG. 3A) an additional reduction in tip motion is noted. The significant point to observe in this instance, however, is that the tip deflection is in the same direction as the applied deflection 80. The intermediate points FIG. 9 shows the results of the finite elements analysis using different values for the offset distance 58.

These results show that the deflection of the tip 41E changes direction between the extreme cases of FIGS. 3A and 3B. This implies that an optimized set of parameters could be found to give a deflection less than some predetermined value. Moreover, if judicious selection of the parameters is made the deflection may be reduced to substantially zero.

In accordance with the present invention the isolating means 12 may thus be implemented by matching: (1) the flexibility (i.e., the material and dimensions) of the reduced portion 42R of the sleeve 42; (2) the flexibility of the bushing 64; (3) the flexibility of the washer 60; (4) the flexibility of the wall 16F of the housing 16; (5) the flexibility of the attachments 54, 56, 62, and 66 therebetween; and (6) the offset distance 58, all so that the first end 41E of the fiber 41 is substantially totally isolated from the effects of a deflection imposed on the sleeve 42.

As seen from FIG. 9 when these factors are considered a device 10 may be construed whereby a deflection imposed in the sleeve 42 results in a displacement of the first end 41E of the fiber 41 with respect to the active element that is substantially unmeasurable. An example of such a configuration of a device wherein the points of attachment 54, 56 and the point of support 47 are selected so that the offset 58 and span 70 have optimized dimensions intermediate the corresponding respective dimensions of the extreme cases of FIGS. 3A and 3B is shown in FIG. 3C.

Figure 4:
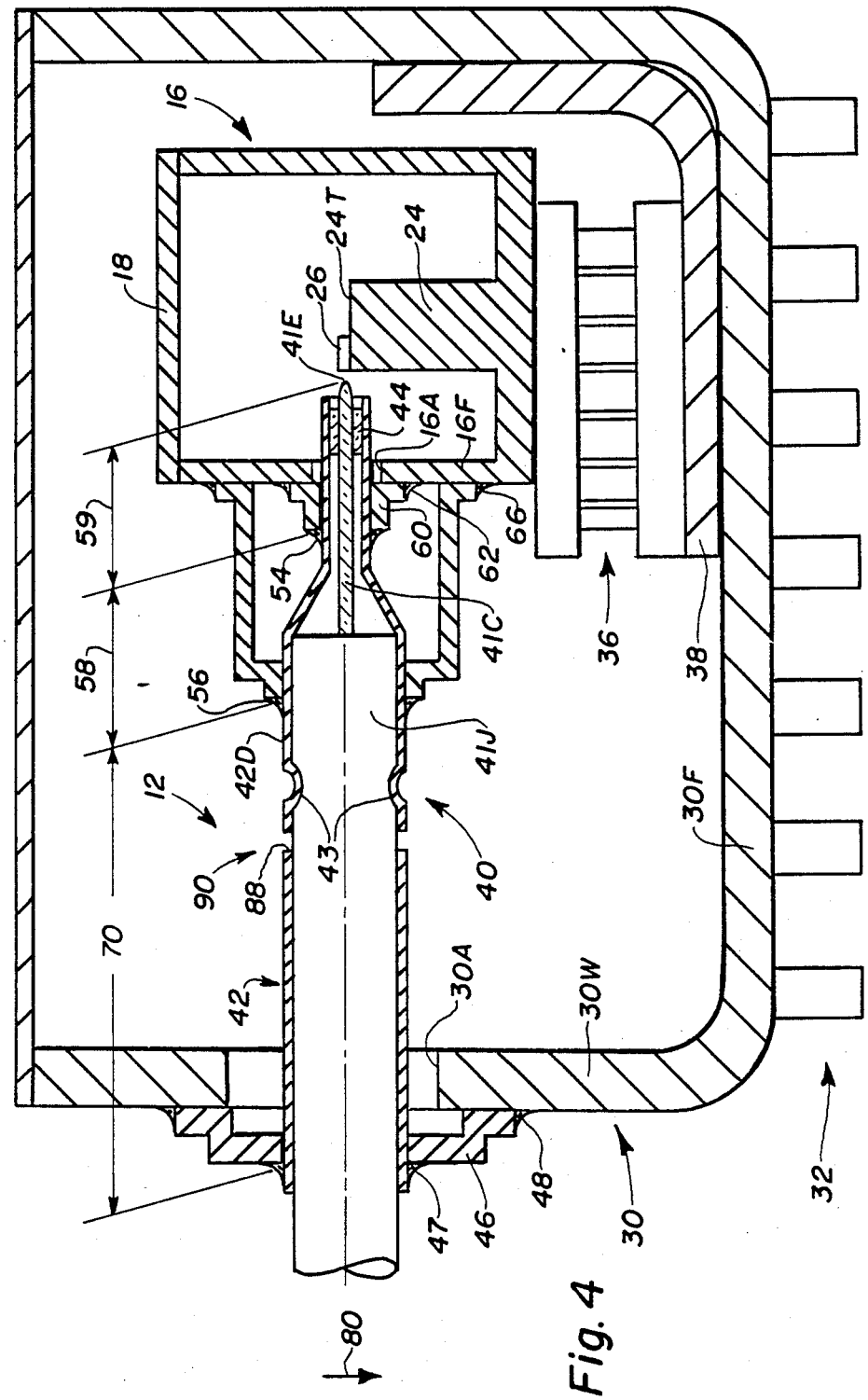
FIG. 4, 5, 6 and 7 are side elevational views in section generally similar to FIG. 3A illustrating alternate embodiments of the present invention.

In the embodiment of the invention shown in FIG. 4 the isolating means 12 is alternately configured and takes the form of a circumferential slot 88 extending completely through the sleeve 42 of feedthrough assembly at a point 90 along the span 70 intermediate the distal attachment location 56 and the point of support 47 between the package 30 and the feedthrough assembly 40. The slot 88 defines two adjacent portions of the sleeve 42. It should be appreciated from inspection of FIG. 4 that the sleeve 42 of the feedthrough assembly 40 there shown does not exhibit the reduced diameter portion 42R extant in FIGS. 3A through 3C and that the point 90 is selected along that portion of the sleeve 46 between the crimp 43 and the point of support 47. Thus the jacket 41J of the cable 41 provides the interconnection or bridge between the adjacent portions of the sleeve 42 produced by the slot 88. The slot 88 could be provided by a series of discontinuous slot segments. Alternatively the slot 88 (in either continuous or discontinuous form) need not extend through the thickness of the sleeve 42. The important point to consider is that the material of the sleeve 46 has been mechanically interrupted to reduce the cross sectional area and therefore the flexibility of the sleeve 42. Thus the ability of the sleeve 42 to transmit deflective forces into the portion of the sleeve within the housing 16 has been significantly attenuated.

Figure 5:
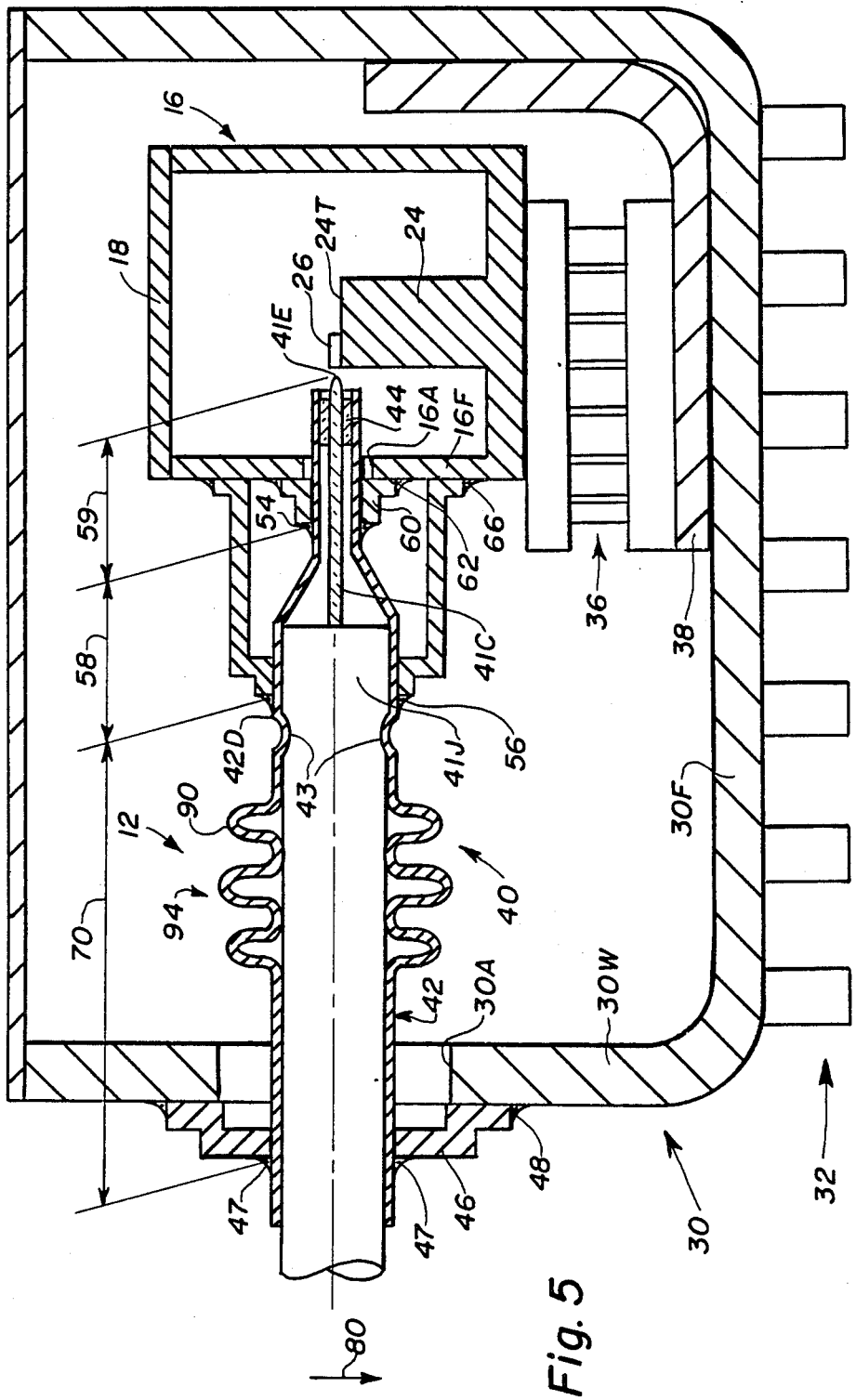
Figure 6:
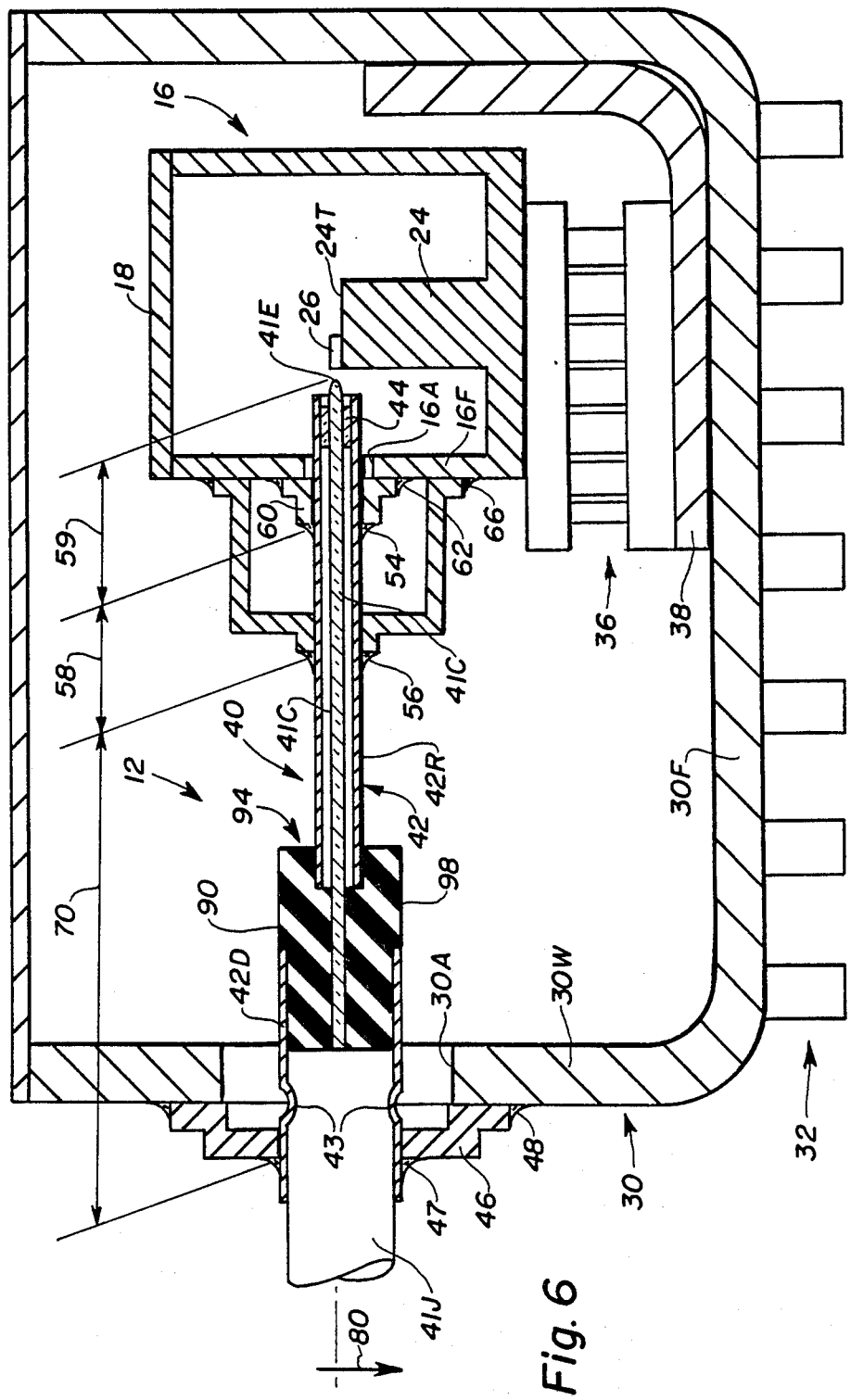
Figure 7:
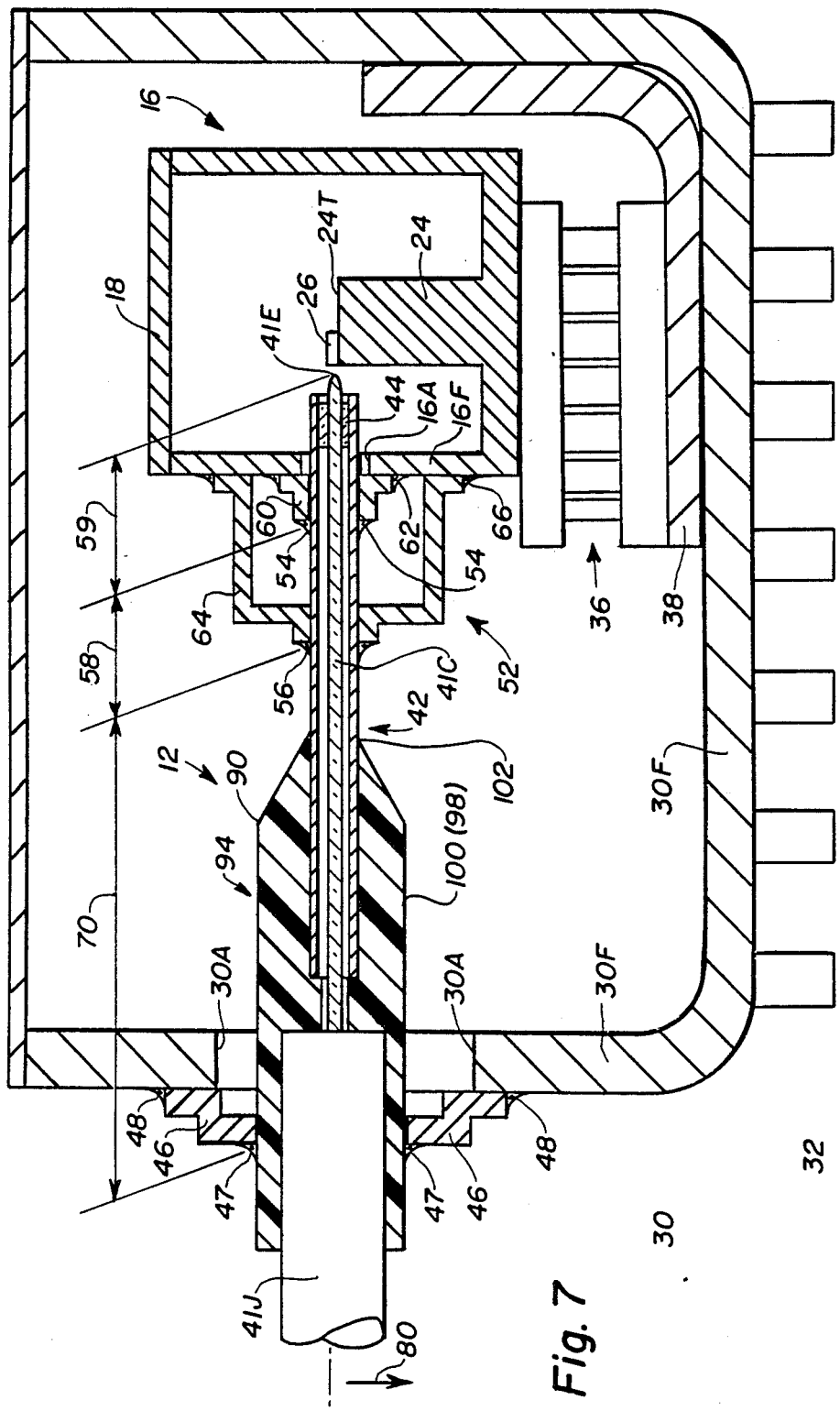

In the embodiment of the invention shown in FIGS. 5, 6 and 7 the isolating means 12 takes the form of a a flexible member 94 disposed in the feedthrough assembly 40 at the point 92 along the span 70 intermediate the distal attachment location 56 and the point of support 47. In FIG. 5 the flexible member 94 is in the form of a bellows 96. The bellows 96 is illustrated in FIG. 5 as being formed by corrugating the material of the sleeve 42. However, the bellows 96 may be formed by introducing a separate corrugated member formed of a material dissimilar from that of the sleeve 42 into the sleeve at the point 92. Along the same lines reference is invited to FIG. 6 and 7 wherein the flexible member 94 takes the form of a separate elastomeric body 98 introduced into the sleeve 42.

In FIG. 6 the flexible member takes the form of an elastomeric body 98 such as a mass of silicone. This material is similar in nature to the material commonly used as an inner jacketing 41J material in the manufacture of fiber optic cable 41, and the body 98 is thus compatible with the cladded glass fiber core 44C with which it is in contact. In FIG. 6 the body 98 is shown as forming a bridge between the reduced diameter portion 42R and the distended portion 42D of the sleeve 46. Such a construction is preferred because it may offer cost advantages over the sleeve requiring the tapered transition portion 42T. However, it should be understood that the body 98 may be provided in either the reduced diameter portion 42R or the distended portion 42D if either of the same is located in the span 70. In this sense the embodiment of FIG. 6 may be viewed as an enhancement of the slotted embodiment of FIG. 4 with the body 98 bridging the two adjacent portions of the sleeve.

In FIG. 7 the flexible member takes the form of an insert injection molded plastic tube 100. The tube 100 has a forward recess 102 and a rear recess 104 therein which respectively formed by the presence in the mold of the reduced diameter portion 42R and the jacketed optical fiber 41J. The material of the tube has a low melt temperature and low flexural rigidity. Suitable for use as the plastic of the tube 100 is polyester. In this embodiment the attachment point 76 is formed with an epoxy cement. Cement such as that sold by Tra-Con., Inc., of Medford, Massachusetts as type Tra-Bond F230 may be used. The plastic tube not only forms the flexible member but also replaces that portion of the metal that attaches to the jacketed portion 41J of the cable 41.

Those skilled in the art, having the benefit of the teachings of the present invention may impart numerous modifications thereto. It should be understood that such modifications are to be construed as lying within the contemplation of the present invention as defined by the present claims.

What is claimed is:

1. A fiber optic device comprising:
   a housing, the housing defining a chamber in which an active element of the device is disposed, the housing having a wall with an aperture therein,
   an optical fiber feedthrough assembly having a fiber optic cable attached within and to a sleeve, a portion of the sleeve extending through the aperture in the
   housing to dispose a first end of the fiber within the chamber, a bushing for attaching the sleeve to the wall of the housing at a first, proximal, location and a washer for attaching the sleeve to the wall of the housing at second, distal, location, the proximal and distal locations being offset from each other by a predetermined offset distance, both of the locations lying along the axis of the sleeve such that when so attached the first end of the fiber lies in an operative relationship to the active element,
   the wall of the housing, the bushing, and the washer and the attachments therebetween cooperating to define a joint assembly having a predetermined flexibility associated therewith,
   a support abutment for supporting the feedthrough assembly at a predetermined point of support, the point of support of the feedthrough assembly and the distal attachment locaton being spaced by a predetermined span therebetween, and
   means disposed on the feedthrough assembly intermediate the first end of the fiber and the point of support of the feedthrough assembly for isolating the first end of the fiber from the effects of a deflection imposed on the feedthrough assembly.

2. The fiber optic device of claim 1 wherein the means comprises:
   the portion of the sleeve intermediate the distal attachment location and the point of support for the feedthrough assembly having a flexibility associated therewith that is greater than the flexibility of the joint assembly whereby the first end of the fiber is isolated from the effects of a deflection imposed on the sleeve.

3. The fiber optic device of claim 1 wherein isolating means comprises:
   a circumferential slot extending completely through the feedthrough assembly at a point along the span intermediate the distal attachment location and the point of support of the feedthrough assembly.

4. The fiber optic device of claim 1 wherein isolating means comprises:
   a flexible member disposed in the feedthrough assembly at a point along the span intermediate the distal attachment location and the point of support of the feedthrough assembly.

5. The fiber optic device of claim 4 wherein the flexible member comprises a bellows.

6. The fiber optic device of claim 4 wherein the isolating means comprises an elastomeric body.

7. The fiber optic device of claim 6 elastomeric body is mass of silicone.

8. The fiber optic device of claim 6 elastomeric body is injection molded plastic.

9. The fiber optical device of claim 1 wherein the wall of the mounting, the sleeve, the bushing, the washer, and the attachments therebetween each have a predetermined flexibility associated therewith wherein isolating means comprises:
   the flexibility of the wall, the sleeve, the washer, the bushing, the attachments therebetween and the offset distance are optimally matched such that the first end of the fiber is substantially totally isolated from the effects of a deflection imposed on the sleeve.

* * * * *